United States Patent [19]

Hsu

[11] 4,050,776

[45] Sept. 27, 1977

[54] ELECTRIC-POWERED ADJUSTABLE REAR-VIEW MIRROR FOR VEHICLES WITH DISENGAGEABLE WORM GEAR

[76] Inventor: Ming Ching Hsu, 97-2, Lane 39 Jen Hsing Street, San Chung Shih, Taiwan, China /Taiwan

[21] Appl. No.: 607,588

[22] Filed: Aug. 25, 1975

[51] Int. Cl.² ............................................. G02B 7/18
[52] U.S. Cl. .................................................... 350/289
[58] Field of Search ........................................ 350/289

[56] References Cited

U.S. PATENT DOCUMENTS

| | | | |
|---|---|---|---|
| 3,005,384 | 10/1961 | Bairo et al. | 350/289 |
| 3,687,525 | 8/1972 | Riccio | 350/289 |

Primary Examiner—Jon W. Henry

[57] ABSTRACT

The present invention relates to a vehicular rearview mirror, particularly a vehicular rearview mirror which can be electrically adjusted by a driver sitting in the driver's seat by pressing lightly a toggle switch with one hand, enabling the rearview mirror to shift its direction upward or downward, to the left or to the right and arrive at the most suitable reflection angle.

2 Claims, 5 Drawing Figures

ELECTRIC-POWERED ADJUSTABLE REAR-VIEW MIRROR FOR VEHICLES WITH DISENGAGEABLE WORM GEAR

BACKGROUND OF THE INVENTION

As well-known to the trade, in the previous vehicular rearview mirror, when an adjustment of its reflection angle is required, the driver of the vehicle must move out of the driving seat and shift the reflection angle by hand through visual measurement to a direction he thinks suitable. Then he will return to the driving seat and check the suitability of the angle; if the angle is not suitable, the mirror must be adjusted once more; in order to adjust the reflection angle of rearview mirror to an accurate, proper direction, the driver must move out of and into the driving seat to repeatedly adjust said rearview mirror several times to achieve the end. In the case of the rearview mirror being fitted at the left and right sides of the driving seat, such as on buses, cargo trucks and vehicles provided with a shifting button, although the driver can remain at his seat and adjust by hand the rearview mirror adjacent to his position to a proper reflection angle, as for the rearview mirror at the other side, he must move out of his seat to make adjustments; again, he must adjust it repeatedly several times to arrive at a proper reflection angle. It is not only troublesome, but also takes time and effort.

SUMMARY OF THE INVENTION

The present invention relates to a vehicular rearview mirror, particularly a vehicular rearview mirror which can be electrically adjusted by a driver sitting in the driver's seat by pressing lightly a toggle switch with one hand, enabling the rearview mirror to shift its direction upward or downward, to the left or to the right and arrive at the most suitable reflection angle.

In order to preclue the disadvantages mentioned above, the objective of the present invention is to provide a simple-operating and self-adjusting vehicular rearview mirror, whose reflection angle can be adjusted to the most suitable angle by a single pressing of a toggle switch with one hand of the driver without his leaving the driving seat to effect directional movements, upward and downward, right and left, upon the rearview mirror.

Hereby two embodiments according to the present invention are described in conjunction with the appended drawings as follows.

Figure 1:
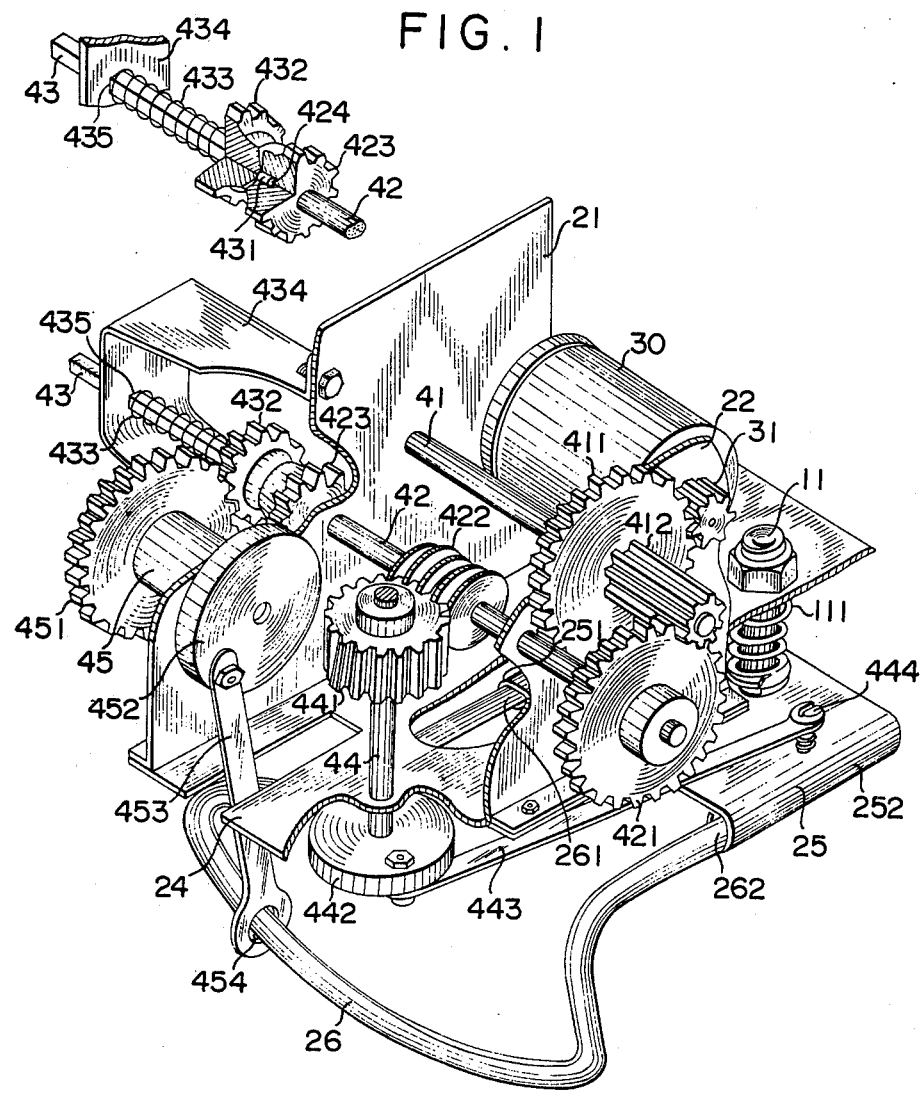
FIG. 1 is a perspective view of one embodiment of the present invention.
Figure 3:
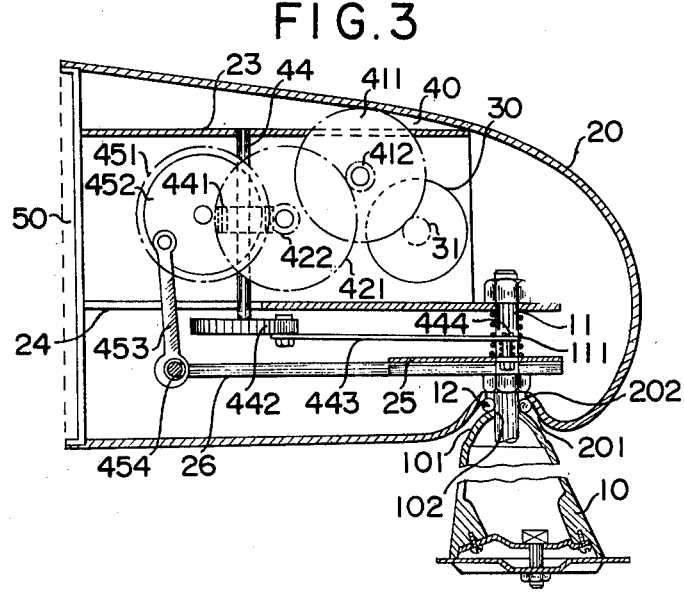
FIG. 3 is a vertical sectional view of the embodiment shown in FIG. 1.

FIGS. 1 and 3 are respectively the perspective view and the cross-sectional side view of embodiment No. 1 of this invention. The form of a mount 10 is similar to a conventional rearview mirror, fitted at a fixed position. Mount 10 is formed as a hollow body, whose upper end is a hemispherical solid body, 101, provided with a hole 102 for a support shaft 11, which is secured integrally with said mount 10 through said hole 102. At the hemispherical solid body 101 above the mount is fitted a housing 20 similar to a conventional rearview mirror in shape, having a recessed portion 201 and provided with a hole 202 larger than the diameter of said support shaft 11, for encircling the latter with a plurality of roller balls 12 held between said hemispherical solid body 101 and housing recess 201 making said housing 20 rotate freely. In said housing 20 is fixed in-laidly a frame 40 formed by the left and right walls 21, 22 with the upper and lower walls 23, 24. The inside of recess 201 is fixed to said support shaft 11 by means of a baseplate 25, a spring 111, and lower wall 24 of the housing in sequence as such, making said housing 20 rotate freely with said frame. Further, the left and right edges 251, 252 of said baseplate 25 are bent downward to overlap two opening side portions 261, 262 of a ring-shaped round rod 26 whose curvature is identical to a segment and is secured integrally with the ring-shaped round rod 26, and a reflecting mirror 50 is put into a front opening of said housing 20.

Between said left and right walls 21, 22 are provided shafts 41, 42, 45 of a two-directional motor 30 of 12V or 24V D.C. and a vertical shaft 44 between the upper and lower walls 23, 24. A small gear 31 is fitted at the shaft of said D.C. two-directional motor 30 extending from the right wall 22, and a larger gear 411 integrated with a longer small gear 412 is fitted at the end of shaft 41 extending from the right wall 22, making said larger gear 411 mesh with said small gear 31. A worm 422 is fitted on the shaft 42 between the left and right walls 21, 22, or the shaft end extending from the right wall 21 is provided a small gear 423 having a hole 424 at the center of its left end face, and a small gear 432 having at its right end face a solid short shaft 431 encircled by the center hole 424 of said small gear 423 being the same size as said small gear 432 which is provided adjacent to the left of said small gear 423, and a square shaft 43 is provided at the left end integrated with said small gear 432 with its left end inserted into a guide square hole 435 at a support frame 434, making said square shaft 43 freely movable left and right, and between the left end face of small gear 432 and the inner side of support frame 434 a press-connecting spring 433 is fitted in-laidly at the square shaft 43, making said small gear 432 press-connected to said small gear 423 and aligned with shaft 42 on the same axis so that said small gear 432 won't move when said small gear 423 rotates. In addition, a worm wheel 441 is fitted at the vertical shaft 44 secured between the upper and lower walls 23, 24, with its threads meshed with the worm on the shaft 42, at the end of said shaft extending from the lower wall 24 is fitted a transmission disc 442, and a larger gear 451 is tightly fitted at the end of shaft 45 extending to the left of left wall 21, meshed with said small gear 432, while a transmission disc 452 is tightly fitted at the shaft end extending to the right, and the transmission disc 442 of said vertical shaft 44 is connected to one end of a connecting rod 443 at a specific eccentric position, the other end 444 is connected to the rear end adjacent to the baseplate 25, also the transmission disc 452 of shaft 45 is connected to one end of connecting rod 453 at a specific eccentric position, with the other end having a hole 454 encircling the arc shape of a ring-type round strip 26 fixed at the baseplate 25. Moreover, a two-directional switch button is fitted so that it is of the driving cab accessible to the hand of a driver sitting in the seat and is connected to the D.C. two-direction motor 30.

Figure 2:
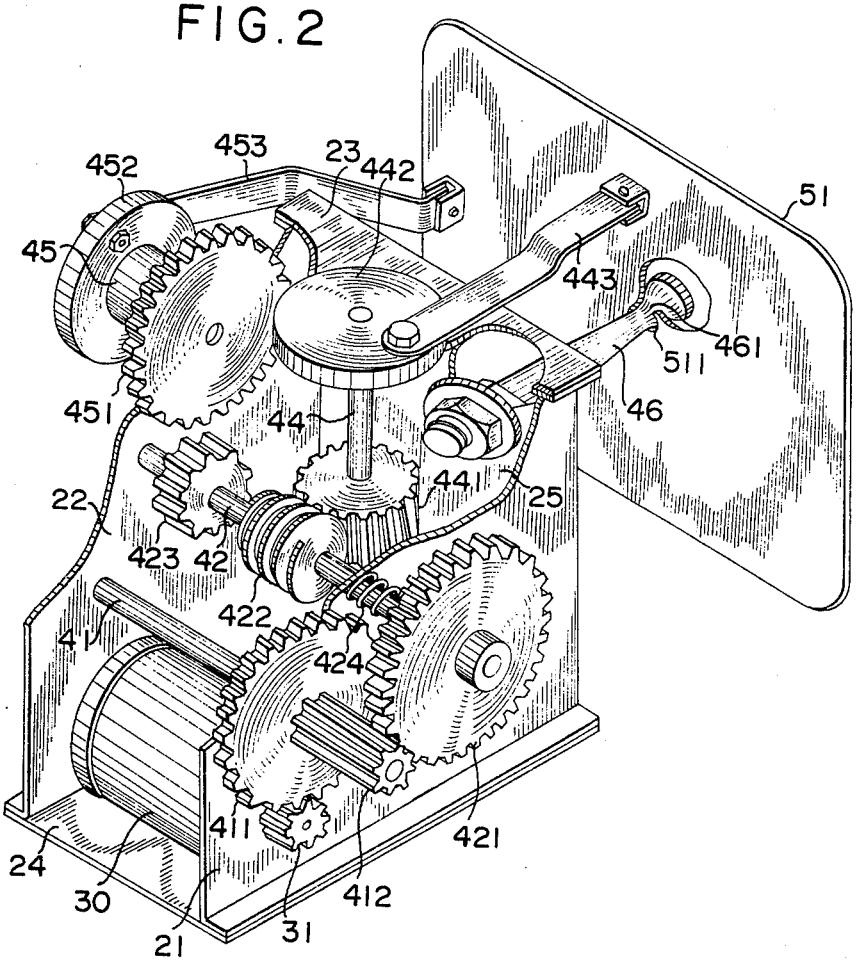
FIG. 2 is a perspective view of a second embodiment of the invention.
Figure 4:
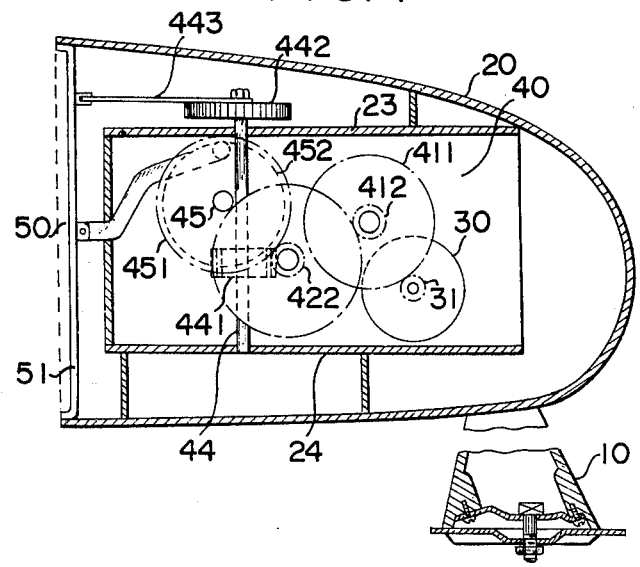
FIG. 4 is a vertical sectional view of the embodiment shown in FIG. 2.

FIGS. 2 and 4 are respectively the perspective view and the cross-sectional side view of embodiment No. 2 of this invention. The parts designated by the same number are of the same construction and function similarly. The difference between this embodiment and the embodiment of FIG. 1 is that the housing 20 is secured to the baseplate 10 with the frame 40 formed and fixed in-laidly into the housing 20, moreover, the larger gear 421 of shaft 42 is press-connected between its back face and the outer side of the left wall 21 by means of a spring 424 fitted to the shaft 42. At the same time, at a meshing position between said larger gear 421 and the left end of a longer small gear 412 of shaft 41, a small gear 423 is fitted to shaft 42 in a disengagement position of the small gear 423 with the larger gear 451 of shaft 45, and a support shaft 46 is tightly fitted on the front wall 25 of said frame 40, making the central hole 511 of the retaining plate 51 of the reflecting mirror 50 encircle the neck portion 461 of which is reduced diameter at its front end, thus the retaining plate 51 rotates freely backward and forward, left and right at the front opening of the housing 20 with said neck portion 461 at the front end of said support shaft as a fulcrum. Subsequently, the other end of the connecting rod 443 connected to the transmission disc 422 is joined at the upper edge slightly off center of the retaining plate 51, and the other end of connecting rod 453 connected to the transmission disc 452 is joined at the left edge of the center of said retaining plate 51.

Figure 5:
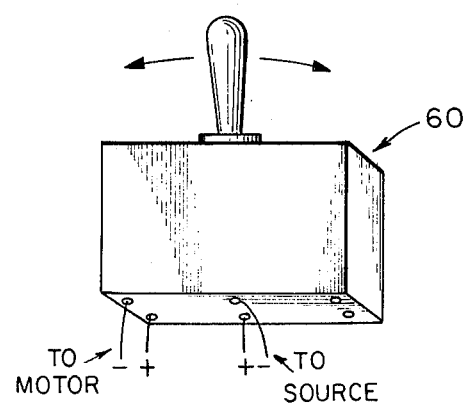
FIG. 5 is a perspective view of a toggle switch for operating the embodiments.

Herewith, the operation is described as follows: As shown in FIG. 1, if the D.C. motor rotates reversely when actuated by the toggle switch 60 shown in FIG. 5 the righthand threaded worm rod 422 rotates in the same direction as said motor 30 by means by gears 31, 411, 412, 421 and shaft 42, then the reversely-rotating righthand threaded worm 422 imparts a rotation to a worm wheel, making shaft 44 turn the transmission disc 442 and, at the same time, actuate the connecting rod 443, which will make the frame 40 and the housing 20 move slightly left and righ simultaniously with the other end 444 joined at the baseplate 25 as a fulcrum. Hence, the rearview mirror 50 fitted at the front opening of the housing 20 shifts left and right in its reflection angles. And, as shown in FIG. 2, the rearward and forward movements of connecting rod 443 directly effects the slight forward and rearward movements of the retaining plate 51, thus the rearview mirror 50 will shift forward and backward in its reflection angles.

Moreover, if the D.C. motor rotates positively, as shown in FIG. 1, the shaft 42 causes the right-hand threaded worm 422 to rotate in the same direction as the motor 30 while the worm wheel 441 rotates in a reverse direction to the threads. Then the worm 422 shifts forward to the direction of the left wall 21, pushing the shaft 42 to the left causing the small gear 423 to mesh with the larger gear 451, and the worm 422 to jumpingly disengage with the worm wheel 441, actuating the rotating shaft 45 so that the frame 40 and housing 20 will be shifted slightly rearward and forward with the hole portion 454 at the other end of the connecting rod 453. Hence, the rearview mirror 50 fitted at the front opening of the housing 20 will move forward and rearward in reflection angles. Again, in FIG. 2, the connecting rod 453 directly makes the retaining plate 51 move slightly left and right, and the rearview mirror 50 shifts its reflection angles left and right. Furthermore, when the D.C. motor 30 stops its positive rotation and rotates reversely, shaft 42 is pressed to slid backward by the tension of springs 424 or 433, thus, the small gear 423 is disengaged with the larger gear 451, the worm 422 and worm wheel 441 are meshed afterward.

The construction of a vehicular rearview mirror according to the present invention is as afore-described, which has the following advantage and functions, that is, under any circumstances, the driver can sit comfortably in the driver's seat, and, by pressing lightly a switch button, he can adjust the rear and forward, left and right reflection angles of the rearview mirror to the most suitable position.

I claim:

1. A universally adjustable mirror comprising a mirror, a support for mounting said mirror for universal movement with respect to a fixed member, a two directional D.C. motor, a shaft rotatable about its axis and movable longitudinally with respect to said axis, gear means for rotating said shaft in accordance with the direction of rotation of said two directional motor, a worm gear mounted on said shaft, a first transmission disc operatively connected to and rotatable by said worm gear when said motor rotates in one direction, a first linkage means connected to said first transmission disc for reciprocally turning said mirror about a first axis, a second transmission disc, a second linkage means connected to said second transmission disc for reciprocally turning said mirror about a second axis substantially perpendicular to the first axis, a driving gear mounted on said shaft for driving said second transmission disc said worm gear operating to move said shaft longitudinally upon rotation of said shaft by rotation of said motor in the opposite direction thereby causing disengagement of said worm gear from said first transmission disc, biasing means for normally urging said worm gear into engagement with said first transmission disc and means for controlling the direction of rotation of said two directional motor.

2. An adjustable mirror as claimed in claim 1 wherein said support for said mirror comprises a backing plate therefor, a ball-type joint connecting the center of said plate to a fixed member and wherein said first and second linkages are each connected to said plate at a point spaced vertically and laterally respectively of said ball-type joint.

* * * * *